United States Patent
Hussey et al.

(10) Patent No.: US 8,165,261 B2
(45) Date of Patent: Apr. 24, 2012

(54) CHEMICAL ENHANCEMENT OF ULTRASONIC FUEL CLEANING

(75) Inventors: Dennis Frank Hussey, San Carlos, CA (US); Kurt Edsinger, Pleasanton, CA (US); Jeff Deshon, Castro Valley, CA (US)

(73) Assignee: Electric Power Research Institute, Inc., Palo Alto, CA (US)

( * ) Notice: Subject to any disclaimer, the term of this patent is extended or adjusted under 35 U.S.C. 154(b) by 672 days.

(21) Appl. No.: 12/349,186

(22) Filed: Jan. 6, 2009

(65) Prior Publication Data

US 2009/0252275 A1 Oct. 8, 2009

Related U.S. Application Data

(60) Provisional application No. 61/011,817, filed on Jan. 22, 2008.

(51) Int. Cl.
*G21C 19/42* (2006.01)
(52) U.S. Cl. .................................. 376/308; 376/310
(58) Field of Classification Search .................. 376/308, 376/310; 588/1, 3
See application file for complete search history.

(56) References Cited

U.S. PATENT DOCUMENTS

| 4,244,749 A | 1/1981 | Sachs et al. |
| 4,320,528 A | 3/1982 | Scharton et al. |
| 4,375,991 A | 3/1983 | Sachs et al. |
| 4,705,573 A * | 11/1987 | Wood et al. .................. 134/3 |
| 4,828,759 A * | 5/1989 | Hanulik ........................ 588/3 |
| 5,200,666 A | 4/1993 | Walter et al. |
| 5,575,863 A | 11/1996 | Sala et al. |
| 6,147,274 A * | 11/2000 | Wood et al. .................. 588/1 |
| 6,290,778 B1 | 9/2001 | Zugibe |
| 6,396,892 B1 * | 5/2002 | Frattini et al. ............... 376/308 |
| 6,572,709 B1 | 6/2003 | Kaneda et al. |
| 6,624,133 B1 | 9/2003 | McKenzie et al. |
| 6,692,632 B1 | 2/2004 | Bremner et al. |
| 6,913,699 B2 | 7/2005 | Moisy et al. |
| 7,128,840 B2 | 10/2006 | Wai et al. |
| 7,134,441 B2 | 11/2006 | Gross et al. |
| 2002/0163990 A1 * | 11/2002 | Frattini et al. ............... 376/308 |
| 2003/0080070 A1 | 5/2003 | Moisy et al. |
| 2003/0183043 A1 | 10/2003 | Wai et al. |

FOREIGN PATENT DOCUMENTS
FR 2590716 A * 5/1987
* cited by examiner

*Primary Examiner* — Ricardo Palabrica
(74) *Attorney, Agent, or Firm* — Curatolo Sidoti Co., LPA; Joseph G. Curatolo; Salvatore A. Sidoti

(57) ABSTRACT

A method for cleaning an irradiated nuclear fuel assembly includes chemically enhancing a technique utilizing an apparatus including a housing adapted to engage a nuclear fuel assembly. A set of ultrasonic transducers is positioned on the housing to supply radially emanating omnidirectional ultrasonic energy to remove deposits from the nuclear fuel assembly. Any corrosion products remaining after ultrasonic fuel cleaning will have exposed surfaces that are susceptible to chemical dissolution.

20 Claims, 7 Drawing Sheets

CHEMICAL ENHANCEMENT OF ULTRASONIC FUEL CLEANING

CROSS REFERENCE TO RELATED APPLICATIONS

This application claims the benefit of the filing date under 35 U.S.C. §119(e) of U.S. Provisional Application for Patent Ser. No. 61/011,817, filed Jan. 22, 2008, which is incorporated herein by reference.

TECHNICAL FIELD

Provided is a technique for the maintenance of nuclear power plants, particularly, ultrasonically cleaning irradiated nuclear fuel assemblies of nuclear power plants.

BACKGROUND

During operation of a nuclear power reactor, impurities and products of the reactor coolant are deposited on nuclear fuel assemblies. These deposits can impact operation and maintenance of nuclear power plants in a number of ways; for example, (a) their neutronic properties can adversely affect the nuclear performance of the reactor; (b) their thermal resistance can cause elevated surface temperature on the fuel rods that may lead to material failure in the rod; (c) their radioactive decay results in work radiation exposure when they are redistributed throughout the reactor coolant system, in particular during power transients: (d) they complicate thorough inspection of irradiated nuclear fuel assemblies by both visual and eddy current methods; (e) deposits released from fuel rods tend to reduce visibility in the spent fuel pool, significantly delaying other work in the fuel pool during refueling outages; (f) once reloaded into the reactor on assemblies that will be irradiated a second or third time, they form an inventory of material that can be redistributed onto new fuel assemblies in a detrimental manner.

Axial offset anomaly (AOA) has been reported in pressurized water reactors (PWRs). AOA is a phenomenon in which deposits form on the fuel rod cladding due to the combination of local thermal-hydraulic conditions and primary-side fluid impurities characteristic of the reactor and the primary system. These deposits cause an abnormal power distribution along the axis of the core, reducing available margin under certain operating conditions. AOA has forced some power plants to reduce the reactor power level for extended periods.

The problem of AOA has necessitated the development of an efficient, cost-effective mechanism for removing PWR fuel deposits. Such a mechanism is also desirable to reduce total deposit inventory to lower dose rates for plant personnel, to improve fuel inspectability, to prepare fuel for long-term dry storage, and to facilitate the collection of corrosion samples for analysis.

Several approaches have been proposed to remove PWR fuel deposits. One method is to chemically clean assemblies in situ in the reactor, or after being removed to a separate cleaning cell. There are several problems with this approach, including cost, potential for corrosion by the cleaning chemicals, and the difficulty of disposing of the resultant highly contaminated chemicals. Perhaps the greatest shortcoming of this chemical only approach is that it is time consuming, requiring several hours to clean a single fuel assembly.

U.S. Pat. No. 6,396,892 and U.S. Patent Publication No. 2002-0163990 A1, both of which are incorporated herein by reference as if fully written out below, disclose an apparatus and method for ultrasonically cleaning irradiated nuclear fuel assemblies of nuclear power plants. Ultrasonic fuel cleaning is effectively a mechanical method for removing corrosion products from nuclear fuel, using cavitating bubbles from induced boiling. Ultrasonic transducers are combined, typically in a radial configuration, to lower the local pressure waves through the water in the fuel assemblies enough to cause nucleate boiling that collapses immediately afterwards. The collapse of the bubble releases solid corrosion products that are then pumped to a filtration system.

The mechanical cleaning is effective, but it is not 100% efficient because corrosion products remain on the fuel assemblies. It is estimated that ultrasonic cleaning removes up to 80% of the total corrosion product inventory on the fuel. A modified ultrasonic cleaning regimen included 'pulsing', or intermittent use of the transducers to enhance the cleaning. This technique had little additional effect on corrosion removal.

The industry had considered options for more complete removal of fuel corrosion via full-system chemical decontamination with fuel in-core. While it is expected that the chemical decontamination with fuel in-core could be safely implemented, the implementation would be lengthy and the process very expensive.

DETAILED DESCRIPTION

Figure 1:
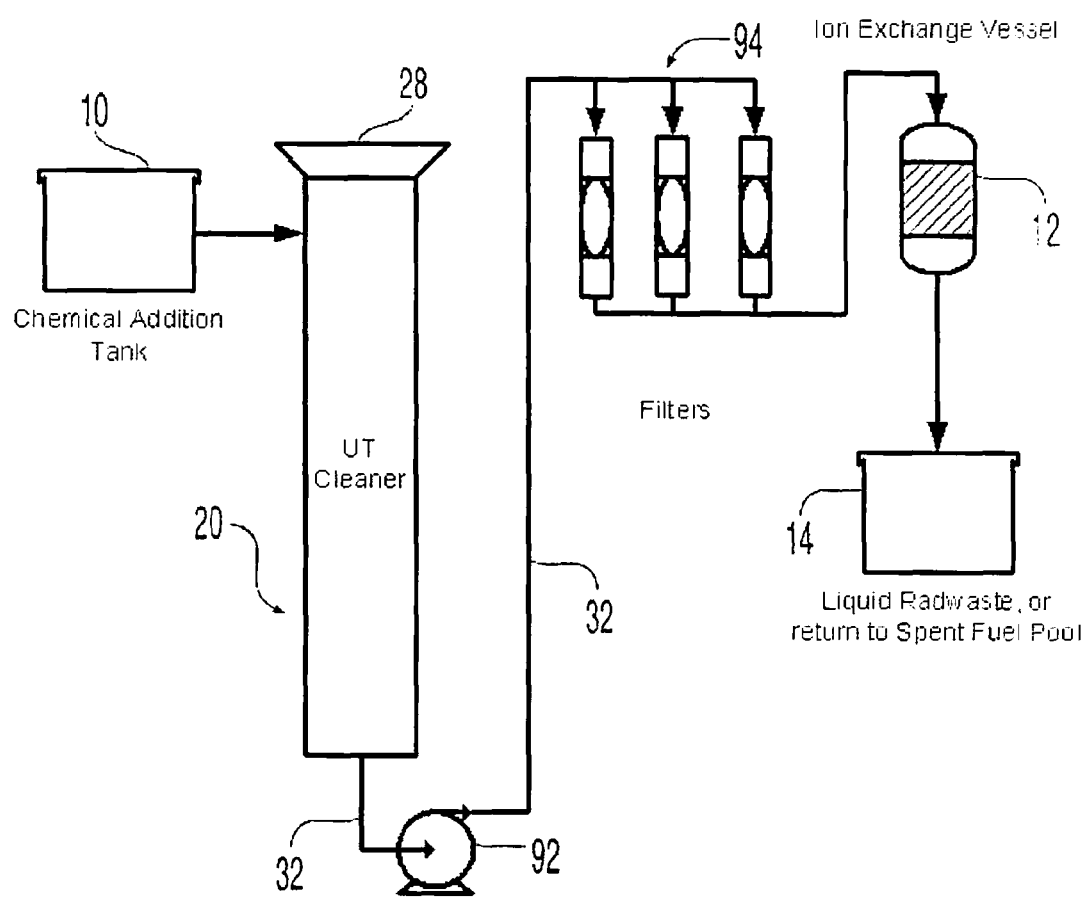
FIG. 1 is a schematic view of an apparatus for conducting a chemically enhanced ultrasonic cleaning method for irradiated nuclear fuel assemblies.

A method is provided that supplements ultrasonic mechanical cleaning with focused chemical decontamination. There is a significant advantage to applying both physical and chemical cleaning together. After corrosion is mechanically dislodged and removed, fresh corrosion surfaces are exposed and can be dissolved. This method enhances the physical removal of corrosion products with chemical dissolution. In certain embodiments, the ultrasonic mechanical and chemical dissolution may be sequenced such that there is a synergistic removal of the corrosion products from the fuel.

This method is less aggressive than chemical in-core intervention, and focuses on the problem of removing additional corrosion products directly from the fuel without allowing chemicals to circulate throughout the primary coolant system. The method incorporates ultrasonic fuel cleaning technology, and supplements it with chemical additions, in certain embodiments, to the top of the ultrasonic cleaning chamber.

According to the subject method, chemical addition is localized to the water in the ultrasonic cleaning chamber rather than throughout the primary system, which minimizes the total liquid waste generated by orders of magnitude. Less aggressive chemistries can be selected that take advantage of the ultrasonic fuel cleaning environment. Only the fuel assemblies are exposed to the chemicals, so there is less chemical cleanup required for the vessel or ex-core piping. In certain embodiments, the chemical addition steps could be applied to selected high flux assemblies that have high corrosion deposition, while other fuel assemblies could be cleaned only ultrasonically.

If corrosion products remain after ultrasonic fuel cleaning, the remaining corrosion products will have exposed surfaces that are susceptible to chemical dissolution. The dissolution of the corrosion products will increase fuel performance by alleviating early cycle axial offset. This effect would be most prominent in plants that have high releases of corrosion products from their steam generators.

The method is suitable for the removal of both activated and non-activated corrosion products. Activated corrosion products with half lives greater than 150 days (such as cobalt-60) will be removed and reduce ex-core radiation fields in future outages. Parent nuclides for shorter lived nuclides (such as nickel-58) will also be removed and assist in reducing ex-core dose rates in future outages.

According to the subject method, the mechanism of enhancing removal of corrosion product deposits from the fuel may include one or more of modifying the deposit surface, oxidizing the deposit, solubilizing the deposit material, or complexing or chelating the deposit solubles. The type of chemical compound that may be used according to the method comprises at least one of a peroxide, an inorganic acid or its salt, an organic acid or its salt, an oxidizing agent or a chelating agent. Chemical compounds useful in reactor shutdown cleanup, and/or in the LOMI/NP or LOMI/AP processes can be used according to the subject method.

Specific compounds that are useful according to the subject method include but are not limited to at least one of hydrogen peroxide, vanadous formate, nitric acid, potassium permanganate, alkaline potassium permanganate, oxalic acid, picolinic acid or sodium picolinate.

FIG. 1 is a schematic view of an apparatus for conducting a chemically enhanced ultrasonic cleaning method for irradiated nuclear fuel assemblies. In one embodiment, a chemical storage tank 10 which stores the chemicals for use in the method communicates with apparatus 20 via a chemical injection port proximate to the top of the housing 24, discussed in more detail with respect to FIG. 2. The chemical(s) may be injected into a liquid, such as water, flowing through the housing, to contact the fuel being cleaned therein, and exit through filtration piping 32, assisted by pump 92, to enter filters 94 for removal of solid particles from the contaminated waste stream. The filtrate liquid then passes through an ion exchange vessel 12, for possible removal or regeneration of complexing or chelating reagents, and for removal of soluble corrosion products, such as ionic/soluble nuclides and metal ions. The treated liquid then may pass to a tank for disposal as liquid rad-waste, or for return to the spent fuel pool.

Each chemical introduced to the fuel pool must be carefully selected. In one embodiment, the chemical selected is hydrogen peroxide because it can be used for nickel dissolution in shutdown chemistry, and thus can remove nickel corrosion products.

The ultrasonic apparatus 20, or cleaning chamber, further can act as an isolation chamber from the rest of the fuel pool. If chemicals are injected only when water is flowing through the housing, they will not contaminate the rest of the pool because they are collected by the filter/ion exchange resins following the system. This allows considerable flexibility in selecting the chemicals for decontamination of the fuel assemblies.

Figure 2:
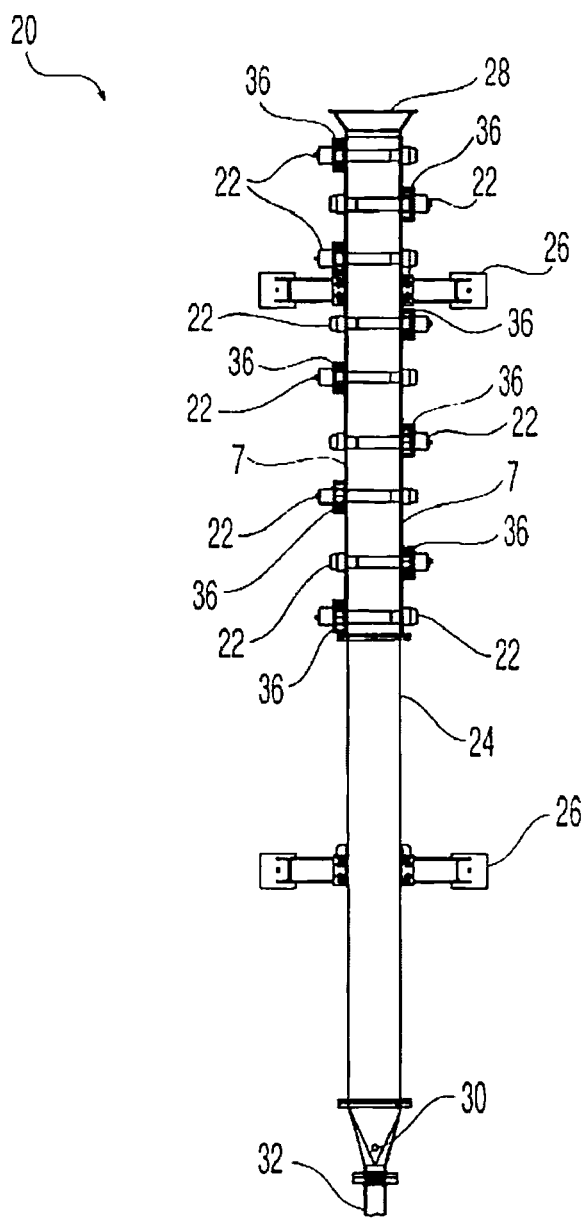
FIG. 2 is a front view of an ultrasonic cleaning apparatus.

FIG. 2 is a front view of one embodiment of an exemplary ultrasonic cleaning apparatus 20 for carrying out the subject method. The apparatus 20 may include ultrasonic transducers 22 mounted on a housing 24. A guide 28 is positioned at the top of the housing 24. A nuclear fuel assembly (not shown in FIG. 2) is passed through the guide 28 and into the housing 24. Once the nuclear fuel assembly is positioned within the housing 24, it is cleaned through the application of ultrasonic energy from the ultrasonic transducers 22, as discussed further below.

Assembly reaction supports 26 may be used to mount the housing 24 to a wall of a cleaning pool. Alternately, the housing 24 may be supported by a crane or hoist. FIG. 2 also illustrates filtration piping 32 and an emergency cooling hole 30, for use in the event that the filtration system fails. The emergency cooling hole 30 provides sufficient decay heat removal from the fuel channel through natural convection in the event of equipment failure (e.g., loss of pumps). Filtration piping 32 is used to send water laden with removed deposits to a filtration unit, as discussed below.

The transducers 22 may be mounted on transducer mounting plates 34. The transducer mounting plates 34 are used to connect the transducers 22 to the housing 24. Transducer spacers 36 are used to mount the transducers 22 to the mounting plates 34 in the proper position.

Figure 3:
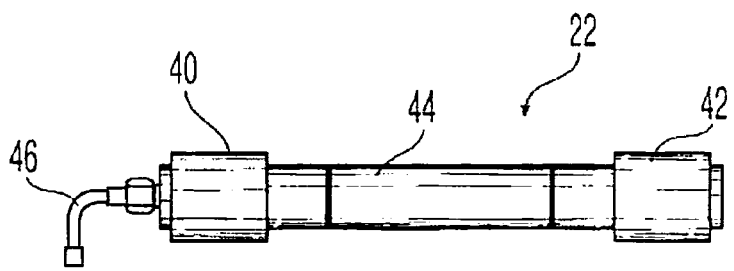
FIG. 3 illustrates an ultrasonic transducer used to produce radially emanating omnidirectional energy.

FIG. 3 illustrates a transducer 22 useful in accordance with the subject method. The transducer 22 includes a first piezoelectric transducer or stack of transducers 40 and a second piezoelectric transducer or stack of transducers 42 mounted on opposite sides of a rod 44. The transducers 40 and 42 receive controlling signals over line 46. The configuration of the transducer 22 produces radial pressure waves emanating from the rod 44 in all directions. Thus, the radially emanating pressure waves are referred to as omnidirectional.

In one embodiment of the method, the omnidirectional pressure waves are contrasted with conventional ultrasonic transducers that produce uni-directional pressure waves in the liquid in which they vibrate. The unidirectional wavefronts are nominally planar, being produced by the motion of a planar structure, like the wall or bottom of an ultrasonic bath, to which the transducer is attached. The transmitted energy dissipates as it encounters physical objects. Thus, in the case of fuel rods of a fuel assembly, it is difficult to use conventional ultrasonics, since it is difficult to drive the ultrasonic energy all the way into the center of the fuel assembly. The required energy to accomplish this is excessive and could possibly cause damage to the fuel.

In one embodiment, the transducers 22 produce omnidirectional pressure waves. The wavefronts are produced by the phase-locked motion of the two piezoelectric transducers 40 and 42. Cylindrically produced pressure waves spaced such that their node structure along the bar axis is approximately equivalent to the fuel rod spacing or a multiple of the fuel rod spacing can more easily penetrate the rows of fuel rods. Therefore, cleaning of the interior rods within the fuel bundle can be accomplished with much lower energy input than would be required if such interior cleaning were to be obtained using conventional ultrasonics. In other words, the transducers, the offset positioning, and their reflectors operate to produce a space-filling energy field that has sufficient energy in the fuel assembly interior to clean the deposits from the most highly screened fuel rod quickly, without transmitting so much energy to a fuel rod that cladding motion physically damages fuel pellets.

The method may be implemented using PUSH-PULL transducers sold by Martin Walter Ultraschalltechnik, GMBH, Staubenhardt, Germany. These transducers are described in U.S. Pat. No. 5,200,666, which is incorporated by reference herein. Ultrasonic frequencies between 20 kHz and 30 kHz and transducer power between 1,000 and 1,500 Watts have proven successful. This produces an energy density between 20-30 Watts/gallon, which is a particularly effective energy density to remove deposits from an irradiated fuel assembly. This energy density is believed to be significantly lower than the energy density realized during the use of conventional ultrasonic transducers.

Other transducers that may be used to produce radially emanating omnidirectional energy include telsonic radiator (tube) transducers and sonotrode transducers (with a transducer on a single side of a rod).

In one embodiment, the transducer body 44 is formed of titanium and stainless steel endcaps are used. The gaskets, cabling, and connectors associated with the device should be configured for operation within a Spent Fuel Pool and must otherwise meet all typical compatibility requirements and safety requirements (e.g. Foreign Material Exclusion, or FME, requirements in the fuel handling area) customary in nuclear power plants.

Figure 4:
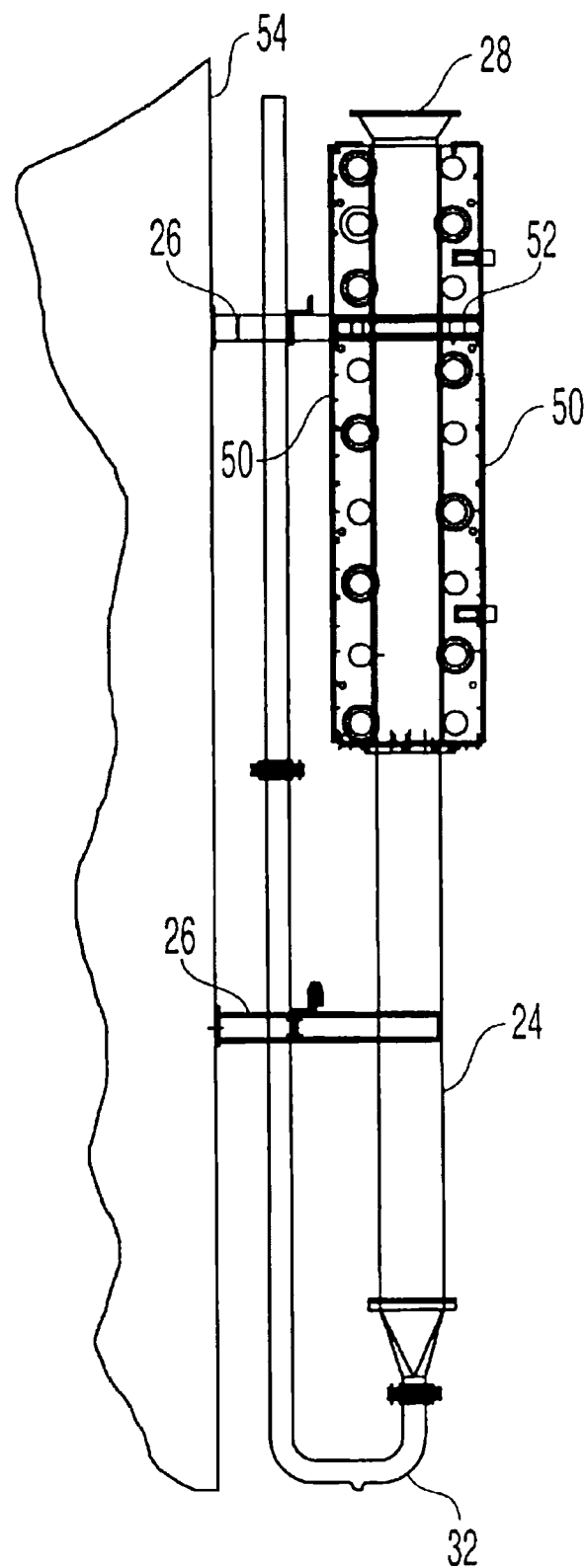
FIG. 4 is a side view of the ultrasonic cleaning apparatus of FIG. 2.

FIG. 4 is a side view of the apparatus 20 of FIG. 2. FIG. 4 illustrates the fuel channel or housing 24, the assembly reaction support 26, the guide 28, filtration piping 32, reflectors 50, and an assembly mounting beam 52. The reflectors 50 are used to increase the amount of ultrasonic energy that is delivered to the fuel assembly. That is, the reflectors 50 operate to reflect ultrasonic energy into the fuel assembly. The assembly mounting beams 52 are used to connect the transducer mounting plates 34 to the assembly reactor supports 26. The assembly reactor supports 26 press against the wall 54 of a fuel pool where cleaning takes place, as discussed below.

The housing 24, mounting plates 34, spacers 36, and reflectors 50 may be formed of stainless steel. Other materials may be used if they meet general safety and materials compatibility requirements typical for operating nuclear power plants. In particular, the selected material should be compatible for use in the fuel storage and handling areas of a plant, including the Spent Fuel Pool and Cask Loading Pit.

The interior surfaces of the housing 24 may be electropolished to reduce the opportunity for radioactive particles to deposit on these surfaces or lodge on pits or crevices in these surfaces. This enables the housing to be disassembled and shipped without personnel radiation exposure. The ultrasonic transducers 22 may be used to clean the housing 24. That is, the transducers 22 are activated when the housing 24 is empty to clean the walls of the housing 24 of deposits.

Figure 5:
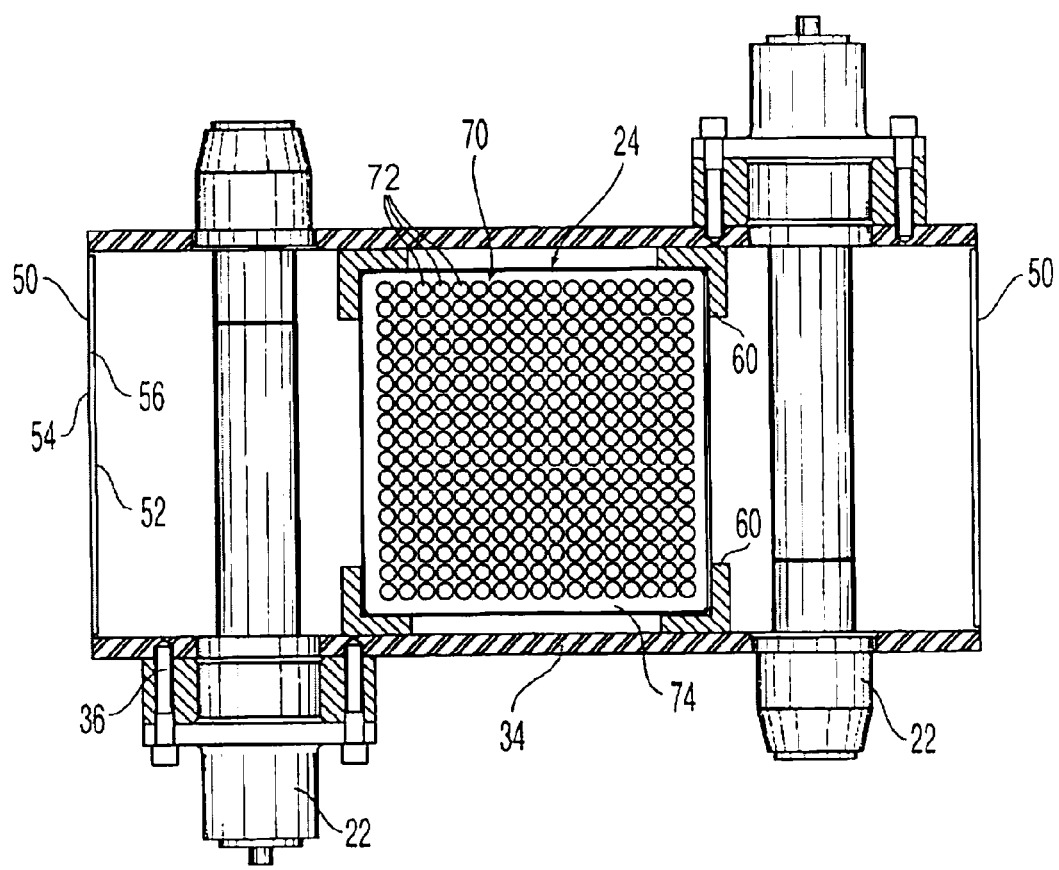
FIG. 5 is a plan view of the ultrasonic cleaning apparatus of FIG. 2 with a nuclear fuel assembly positioned inside it.

FIG. 5 is a plan view of the ultrasonic cleaning apparatus 20. FIG. 5 illustrates the following previously disclosed components: the transducers 22, the housing 24, the transducer mounting plates 34, the transducer spacers 36, and the reflectors 50. The figure also illustrates housing spacers 60, which operate to allow ultrasonic energy to pass into the two sides of the apparatus that do not face transducer arrays. Each reflector 50 includes an interior reflector surface 56 and an outer surface 54 separated by an air gap 56. This configuration has proved to be particularly effective in reflecting the ultrasonic energy.

FIG. 5 also illustrates a fuel assembly 70 positioned within the housing 24. The fuel assembly 70 includes individual fuel rods 72. Deposits 74 are shown adhering to the fuel rods 72. Deposits of this type may be removed in accordance with the subject method.

FIG. 5 illustrates a 17×17 fuel assembly 70. The housing 24 may be configured to accept all designs of Light Water Reactor Fuel. The housing may also be implemented for alternate fuel sources.

The apparatus of FIGS. 2-5 provides high-energy-density ultrasonics to remove tightly adherent deposits from irradiated nuclear fuel assemblies. In particular, the transducers 22 produce a power density and sonic field to penetrate into the center of the fuel bundle 70 so as to clean fuel rod cladding located there. The transducers 22 are installed (axes oriented horizontally) in vertical arrays along two sides of the fuel assembly (e.g., as shown in FIG. 2). FIG. 2 illustrates transducers 22 at the top of the housing 24 because this corresponds to the position of deposits in most Pressurized Water Reactors. The transducers 22 may be positioned along the entire length of the housing 24 or at limited strategic locations.

The fuel rods within an assembly 70 typically number over 200 and may be arranged in a square pitch array (e.g. 17×17). On a candidate assembly for cleaning, the cladding housing the fuel pellet stack is covered with deposits, which are to be removed. In one embodiment, for each vertical array of transducers, adjacent transducers are offset in the lateral direction, such that the nodes on one transducer (i.e., points undergoing zero displacement for the excited mode shape) are aligned with the points of maximum displacement on the adjacent transducers above and below during system operation. In addition, each transducer may be offset axially in this manner from the one located on the opposite side of the fuel assembly. In other words, it is desirable to position the transducers for half wave offset (or multiples thereof) along the axis of facing transducers. This positioning significantly improves penetration of the tube bundle.

Figure 6:
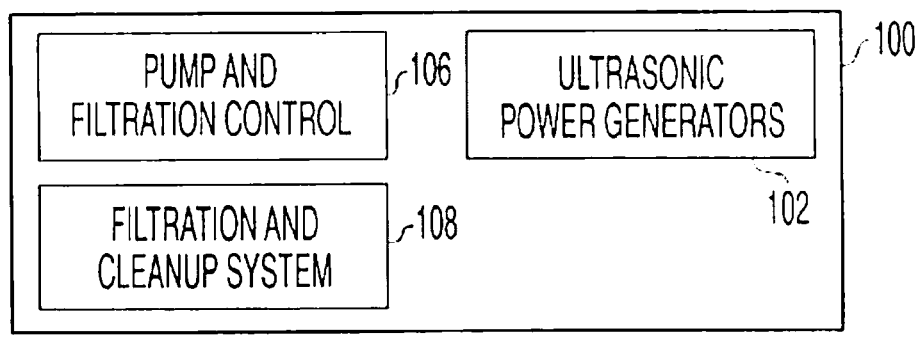
FIG. 6 illustrates the ultrasonic cleaning apparatus of FIG. 2 and associated pump and filtration equipment used in accordance with one embodiment.
Figure 6:
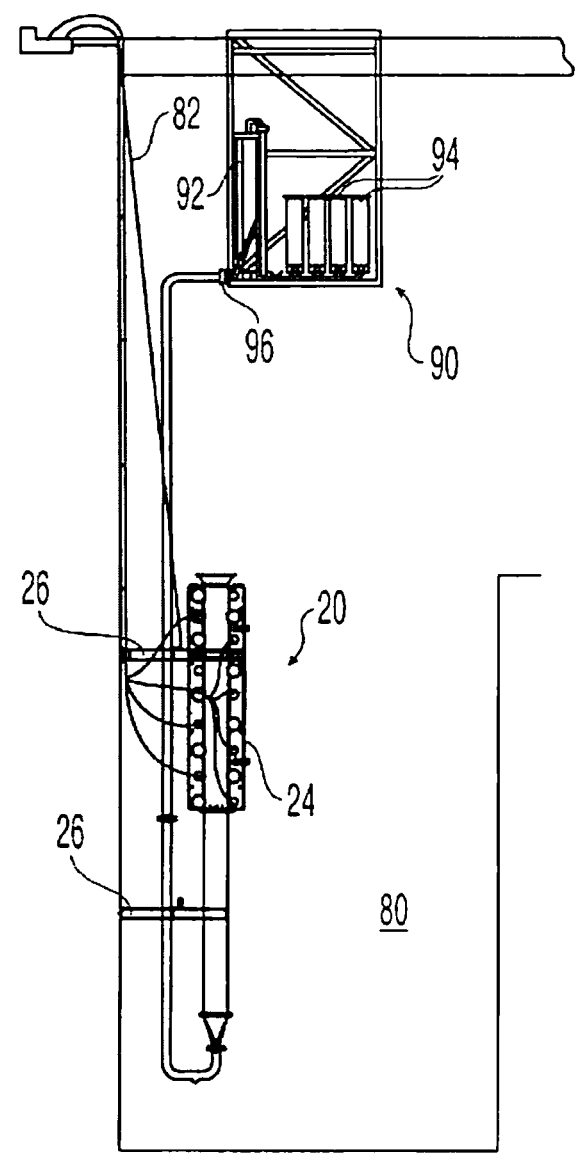

FIG. 6 illustrates the apparatus 20 positioned in a fuel pool 80. In this embodiment, the apparatus 20 is mounted using the assembly reaction supports 26. A cable 82 may also be used to support the apparatus 20. The apparatus 20 has an associated pump and filtration assembly 90. The assembly 90 includes at least one pump 92 and a set of filters 94. A radiation sensor 96 may be positioned at the entry point to the pump. The radiation sensor 96 is used to determine when the fuel assembly is clean. In particular, when the gamma activity at the sensor 96 drops to a baseline value, it is known that no more fuel deposit particles are being removed and therefore cleaning is complete.

FIG. 6 also illustrates ancillary control equipment 100 associated with various embodiments. The equipment 100 may include ultrasonic power generators 102, pump and filtration control circuitry 106, and a filtration and clean-up system 108.

Figures 7A, 7B, 7C:
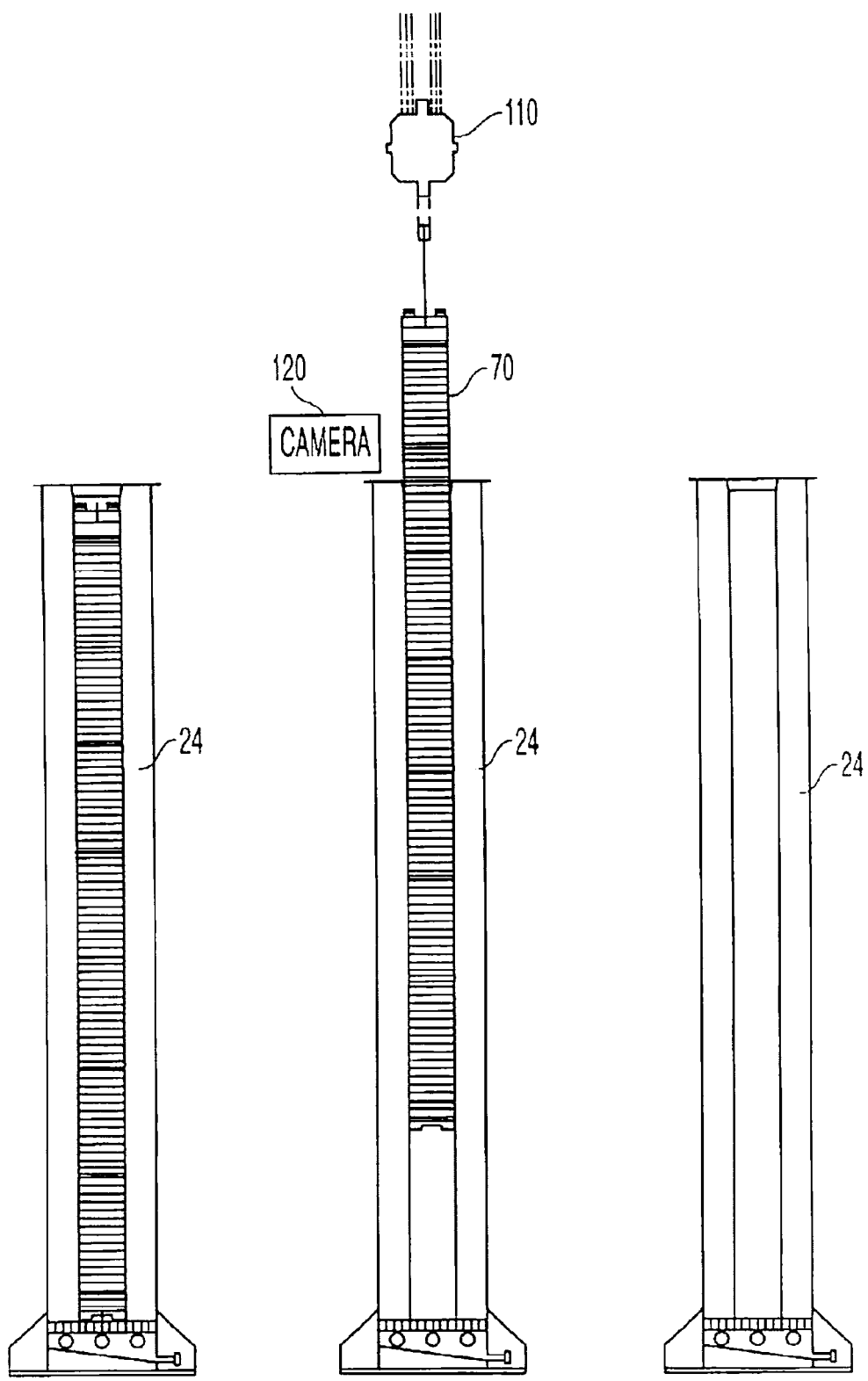
FIGS. 7(a)-7(c) illustrates the process of positioning a fuel assembly within the housing

FIGS. 7(a)-7(b) illustrate the positioning of a fuel assembly 70 into a simplified depiction of the housing 24. The fuel assembly 70 is positioned through the use of a hoist 110. In FIG. 7(a) the fuel assembly 70 is within the housing 24. In FIG. 7(b) the fuel assembly 70 is partially removed from the housing 24. In FIG. 7(c) the fuel assembly 70 is removed from the housing 24. The hoist 110 of FIGS. 7(a)-7(b) may be used in the system of FIG. 6 to insert and remove a fuel assembly 70 from the pool 80. The hoist 110 may also be used to reposition the fuel assembly 70 during ultrasonic cleaning, so as to clean different areas along the axial length of the fuel assembly 70.

Once a fuel assembly 70 is positioned within the housing 24, ultrasonic cleaning commences. Successful results have been achieved using omnidirectional radial ultrasonic waves operating at a frequency of between approximately 20 and 30 kHz and a transducer power between 1.000 and 1.500 Watts. As appreciated with reference to FIG. 6, the pump 92 may draw water through the fuel assembly, thereby flushing the deposits which are removed by the ultrasonic energy produced by the transducers 22. Providing a downward flow through the housing 24 eliminates the need for sealing the top of the housing 24.

In addition to flushing deposits that are removed by the ultrasonic energy, when the removal enhancing chemical compounds are introduced into the water from the injection port proximate to the top of the housing, the chemicals aid in removing the deposits physically and/or chemically, such as by modifying the deposit surface, oxidizing the deposit, solubilizing the deposit, or complexing or chelating the deposit.

During Light Water Reactor operation, the in core irradiation of fuel rod cladding and the subsequent corrosion of these components may introduce deposits of activation products such as $^{54}$Mn, $^{55}$Fe, $^{60}$Co, $^{63}$Ni, and transuranics such as $^{241}$Pu onto the fuel assembly surfaces. The nitric permanganate-low oxidation-state transition-metal ion (LOMI/NP) process can be used to decontaminate these components, in certain embodiments by oxidizing chromium to a more soluble form, making it available to a chelating agent and removal from the system, and exposing additional corrosion products for removal by solubilization. Chelating agents, such as but not limited to picolinic acid, form strong complexes with actinides, lanthanides, heavy metals, and transition metals, and help them to stay in solution. These contaminated solutions, after use, may be treated with ion-exchange resins to extract soluble metals and chemicals. These resins may be processed and disposed.

The chemically enhanced removal method, in certain embodiments, may use a combination of organic acids and chelating agents (LOMI reagents) to dissolve oxide deposits from fuel surfaces and suspend the resulting organo-metal complexes in solution. $V^{+2}$ (as vanadous formate) may be used to reduce the $Fe^{+3}$ in oxide deposits to $Fe^{+2}$. The mechanism may involve electron stripping rather than attack of the deposit by acid. Picolinic acid (as sodium picolinate) may be used as a complexing agent. The reaction destabilizes the oxide deposit releasing the metal ions to the solution. The excess picolinate in the reagent complexes with the metal ions and keeps them from redepositing on the fuel surfaces.

Some oxide deposits have significant concentrations of chromium that adversely affect the dissolution of the oxide layer. In this instance, oxidizing treatments may be used on such deposits to condition them by rendering the chromium soluble through oxidation from the +3 to the +6 valence state. This may be accomplished by the injection of nitric acid potassium permanganate (NP) (optionally at a pH of 2.5) or alkaline potassium permanganate (AP), (optionally at a pH of 10-11.5). These solutions render the chromium soluble, leaving behind an iron-rich deposit that can be dissolved using the LOMI reagents or other chemicals.

During the cleaning process, the contaminated effluent solution may be passed through cation exchange resins to remove the corrosion and activation products and residual metallic ions, and to regenerate or remove the chemical reagents.

The LOMI reagents and dissolved radionuclides and metal ions may be removed from the system through treatment with ion-exchange resin columns. Both strong-acid cation and weak-base anion resin columns may be employed to process the spent LOMI reagent solution.

The NP (or AP) reagents may be removed on ion-exchange resin columns. Residual $MnO_2$ that is formed during the oxidation process may be dissolved with oxalic acid, which may be added directly to the permanganate solution and removed on a mixed-bed resin column. Following the oxalic acid rinse, the initial LOMI technique can be repeated using a more dilute concentration of LOMI reagents. In either case, the spent reagents and corrosion products removed during the cleaning process may be processed through ion-exchange resins, and these resins may constitute the decontamination waste product.

The fuel assembly 70 may be supported at all times by the hoist 110 so that the housing 24 never actually supports the weight of the fuel assembly 70 during the cleaning process. As previously disclosed, the transducers 22 may be mounted on the outside of the housing 24 such that the ultrasonic energy passes through the housing walls. It has been observed that the primary effect of the intervening housing walls is attenuation of the low-frequency portion of the ultrasonic signal. The high-frequency portion of the ultrasonic signal (i.e. frequencies greater than 10 kHz), responsible for the majority of the cleaning effectiveness, passes through a properly designed housing with little attenuation.

A typical cleaning sequence in accordance with the method is as follows. The fuel hoist 110 picks up a fuel assembly 70 from a fuel storage rack. Mobile machinery associated with the hoist 110 transports the fuel assembly 70 to the pool 80 or some other cleaning station. The fuel assembly 70 may be video taped as it is inserted into the housing 24. By way of example. FIG. 7(b) illustrates a camera 120 positioned at the top of housing 24 to video the fuel assembly 70. The transducers 22 are then energized. The hoist 10 may be used to jog the assembly 70 up and then down, on two minute intervals (i.e. up for two minutes, down for two minutes . . . ). Each jog excursion may be approximately several inches.

Gamma radiation activity is monitored with sensor 96. The water with radioactive fuel deposit particles is pumped by the pump 92 through the filters 94 and is then returned to the pool 80. The total radioactivity of the filters 94 may be monitored. Once the gamma activity at the sensor 96 drops back to baseline, it is known that no more fuel deposit particles are being removed and therefore cleaning is complete. According to certain embodiments, the cleaning sequence may be completed in between 7-10 minutes. This stands in contrast to prior art chemical approaches that last for hours.

Ultrasonic cleaning is currently performed within critical path time. Detailed chemical addition sequences (including residence time of the chemical in the cleaner, resultant changes in flow rates during chemical additions, and appropriate line-ups to filters or ion exchange) may impact the length of time that a fuel assembly spends in the cleaner. In addition, the generated waste may be of a different classification.

After cleaning, the fuel assembly 70 is removed from the housing 24, optionally while being video taped. Video tape from before and after cleaning may be studied to confirm the success of the process.

The hoist 110 then moves the fuel assembly 70 to the fuel storage rack. The cleaning system is now ready to accept the next fuel assembly 70 for cleaning. Observe that in the case of a strongly supported housing 24, a single hoist 110 may be used to load a set of ultrasonic cleaning devices 20. Such a configuration enhances overall throughput.

The ultrasonic cleaning technique of the method can clean without imparting potentially damaging force on the fuel pellets. The ultrasonic waves utilized in accordance with the method do not penetrate the gas typically found between the pellet and the interior surface of the cladding, so that the only means of transmitting harmful vibrational energy to the pellets is by motion of the cladding interior surface against the pellets. Experimental results demonstrate that the vibration spectrum of the cladding is comparable to the vibration spectrum experienced by the fuel during operation. That the harmful vibrations are bounded by typical operating conditions in the reactor would not be expected to hold true for conventional ultrasonics, since the much higher energy input required to clean the interior rods within the fuel bundle could be expected to be harmful to the pellets.

Those skilled in the art will appreciate that the method may be implemented in a variety of apparatus configurations.

Figure 8:
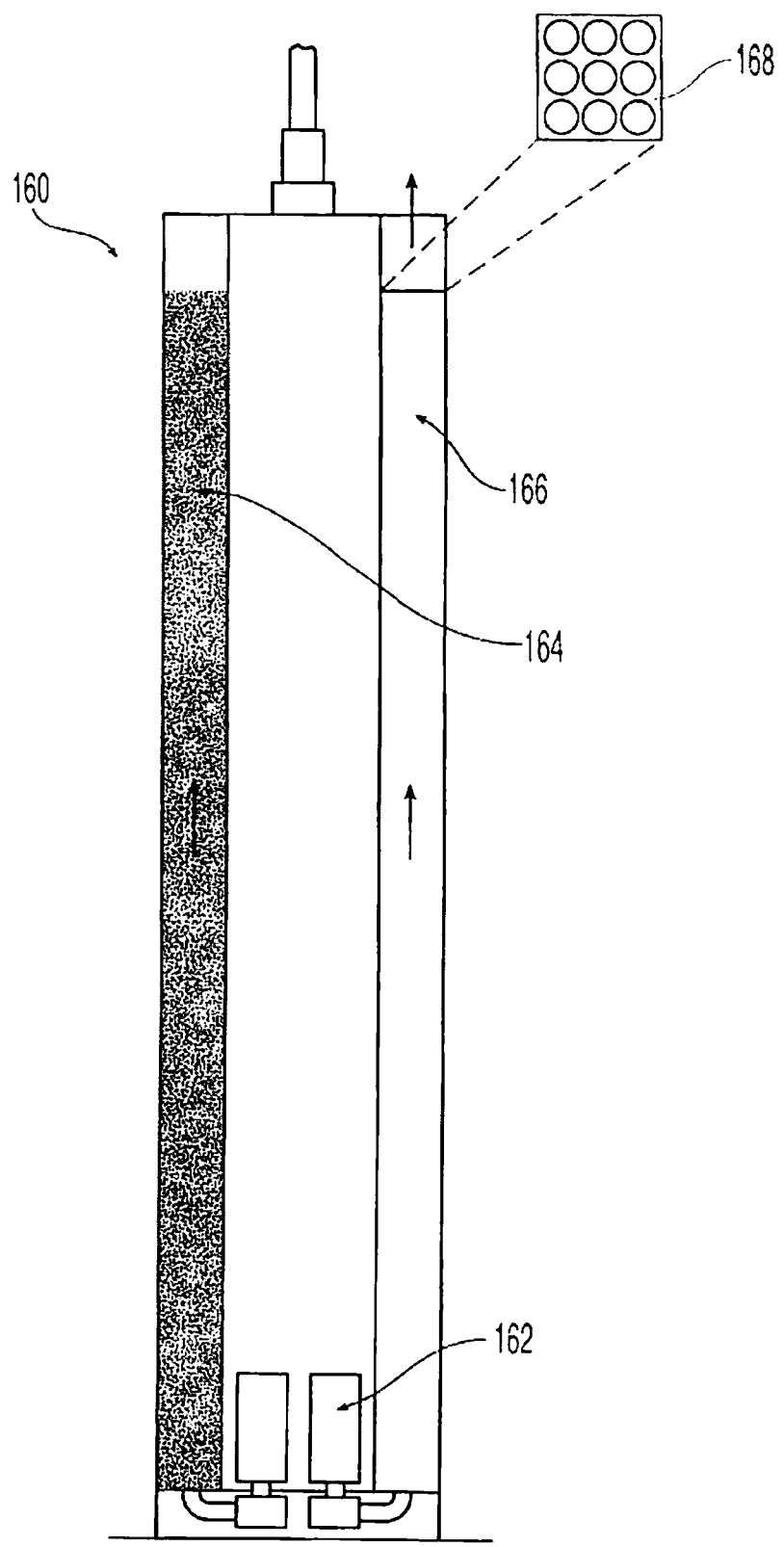
FIG. 8 illustrates an ultrasonic cleaning apparatus with an integral pump and filtration system.

FIG. 8 illustrates a channel 160 for receiving an ultrasonic cleaning apparatus and an associated fuel assembly. The channel 160 includes an integral pump 162 and integral filters 164 and 166. Thus, in this embodiment, a single integrated system provides both the cleaning and filtration functions. Filter 164 may be a coarse filter for internal circulation, while filter 166 may be a fine filter to exhaust to a fuel pool during final cleaning. Block 168 illustrates that the fine filter 166 may be implemented with a matrix of pleated filters (e.g. nine two inch pleated filters).

Those skilled in the art will appreciate that the method provides a time-efficient, effective, compact, low-cost technique to remove deposits from nuclear fuel assemblies. The technique is extremely fast compared to prior art chemical only approaches.

The subject method also allows a fuel assembly to be cleaned without disassembling it. The technique does not produce adverse cladding displacements that would otherwise threaten the physical integrity of irradiated fuel pellets. In other words, interior deposits in a fuel assembly can be cleaned without any consequence during the subsequent reactor re-start.

Another significant benefit associated with the method relates to improved radiation management and reduced radiation exposure for plant personnel. The fuel deposit particles removed by the cleaning process are in fact the same radioactive material which, when distributed about the coolant loop as a result of thermal/hydraulic transients in the core, cause the most significant personnel doses during outages. Thus, by cleaning the fuel and bottling up the radioactive particulate on filters, which themselves may be safely stored in the fuel pool for long periods of time (while their activity decays), one can achieve reductions in outage dose rate and personnel dose. Hence, fuel cleaning as a strategy for dose rate control and dose rate reduction is a viable new method for reducing radiation management costs.

The subject chemical enhanced cleaning method helps to ensure fuel reliability by removing excess corrosion products. The method also assists in radiation source term reduction by removing radioactivity from the fuel before it can deposit on the plant surfaces.

The foregoing description, for purposes of explanation, used specific nomenclature to provide a thorough understanding of the method. However, it will be apparent to one skilled in the art that the disclosed specific details are not required in order to practice the method. In other instances, well-known devices are shown in block diagram form. Thus, the foregoing descriptions of specific embodiments are presented for purposes of illustration and description. They are not intended to be exhaustive or to limit the method to the precise forms disclosed, as many variations and modifications can be made by one skilled in the art without departing from the spirit and the scope of the invention. It should be understood that the embodiments described above are not only in the alternative, but can be combined.

The invention claimed is:

1. A method of cleaning an irradiated nuclear fuel assembly, the method comprising:
   positioning a nuclear fuel assembly within and adjacent to a housing containing a liquid;
   supplying radially emanating omnidirectional ultrasonic energy from transducers each capable of supplying radially emanating omnidirectional ultrasonic energy waves positioned on the housing to the nuclear fuel assembly to remove a deposit from the nuclear fuel assembly, and
   contacting the nuclear fuel assembly with at least one chemical in the liquid capable of enhancing removal of the deposit while supplying the radially emanating omnidirectional ultrasonic energy.

2. The method of claim 1, wherein said enhancing removal comprises at least one of modifying the deposit surface, oxidizing the deposit, solubilizing the deposit, complexing the deposit or chelating the deposit.

3. The method of claim 1, wherein the chemical comprises at least one of a peroxide, an inorganic acid or its salt, an organic acid or its salt, an oxidizing agent or a chelating agent.

4. The method of claim 1 wherein the chemical comprises at least one of hydrogen peroxide, vanadous formate, nitric acid potassium permanganate, alkaline potassium permanganate, oxalic acid, picolinic acid or sodium picolinate.

5. The method of claim 1, wherein said supplying includes selectively reflecting the radially emanating omnidirectional ultrasonic energy within the housing, optionally wherein said supplying includes supplying radially emanating omnidirectional ultrasonic energy with a frequency between approximately 20 to 30 kHz at a transducer power between 1,000 and 1,500 Watts.

6. The method of claim 1, wherein said supplying includes supplying a first set of radially emanating omnidirectional ultrasonic energy waves with minimum displacement nodes at selective positions, and supplying a second set of radially emanating omnidirectional ultrasonic energy waves with maximum displacement nodes at the selective positions.

7. The method of claim 1, further comprising circulating the liquid through the housing during said supplying.

8. The method of claim 7, wherein said contacting comprises injecting the chemical into the liquid while circulating the liquid through the housing.

9. The method of claim 7, wherein the chemical comprises a combination of oxidizing agent, organic acid, chelating agent or chemical dispersant.

10. The method of claim 9, wherein the organic acid comprises vanadous formate and the chelating agent comprises at least one of picolinic acid or sodium picolinate.

11. The method of claim 9, including prior to injecting the organic acid and the chelating agent, injecting nitric acid potassium permanganate, optionally at a pH of about 2.5, or alkaline potassium permanganate, optionally at a pH of about 10 to about 11.5.

12. The method of claim 7, further comprising isolating chemicals from a fuel pool by injecting the chemical only when the liquid is flowing through the housing, and collecting the chemical by at least one of filtering or ion exchanging.

13. The method of claim 7, further comprising measuring radioactive activity within the liquid.

14. The method of claim 13, further comprising stopping said supplying when the radioactive activity drops to a predetermined level.

15. The method of claim 7, further comprising filtering the liquid after said contacting.

16. The method of claim 15, further comprising ion exchanging filtrate from said filtering.

17. The method of claim 16, wherein the ion exchanging comprises passing the filtrate through at least one of a strong-acid cation resin, a weak base anion resin, or both.

18. The method of claim 16, further comprising at least one of removing or regenerating complexing or chelating chemical reagents, or removing soluble corrosion or activation products or residual metallic ions.

19. The method of claim 16, further comprising passing the filtered and ion exchanged liquid to a tank for disposal as liquid rad-waste, or for return to a spent fuel pool.

20. The method of claim 1, further comprising re-positioning the nuclear fuel assembly at a sequence of positions along the longitudinal axis of the housing during said supplying.

* * * * *